US012690109B2

(12) United States Patent
Yang

(10) Patent No.: US 12,690,109 B2
(45) Date of Patent: Jul. 21, 2026

(54) CONTROL CIRCUIT WITH OVERCURRENT PROTECTION AND OVER TEMPERATURE PROTECTION

(71) Applicant: Ping Yang, Dongguan City (CN)

(72) Inventor: Ping Yang, Dongguan City (CN)

( * ) Notice: Subject to any disclaimer, the term of this patent is extended or adjusted under 35 U.S.C. 154(b) by 319 days.

(21) Appl. No.: 18/647,143

(22) Filed: Apr. 26, 2024

(65) Prior Publication Data

US 2025/0338376 A1 Oct. 30, 2025

(51) Int. Cl.
| | |
|---|---|
| *F21K 9/235* | (2016.01) |
| *H02H 3/08* | (2006.01) |
| *H02H 3/087* | (2006.01) |
| *H05B 45/50* | (2022.01) |

(52) U.S. Cl.
CPC ............. *H05B 45/50* (2020.01); *H02H 3/085* (2013.01); *H02H 3/087* (2013.01)

(58) Field of Classification Search
CPC .. F21K 9/27; H02P 7/29; H05B 45/50; H02H 3/085
See application file for complete search history.

(56) References Cited

U.S. PATENT DOCUMENTS

2004/0105664 A1* 6/2004 Ivankovic ................. H02P 7/29
388/800
2018/0279429 A1* 9/2018 Sadwick ................... F21K 9/27

FOREIGN PATENT DOCUMENTS

CN 209445116 U 9/2019

* cited by examiner

*Primary Examiner* — Cortez M Cook
(74) *Attorney, Agent, or Firm* — BACON & THOMAS, PLLC

(57) ABSTRACT

A control circuit includes a control chip and a protection circuit module. A first output port and a second output port of the protection circuit module are electrically connected to a load. An overcurrent protection resistor is electrically connected between the second output port and a ground. A thermistor and a node between the overcurrent protection resistor and the second output port are electrically connected to the comparator unit. A bypass switch is electrically connected to the comparator unit, the ground, and the control chip. When a current flowing through the overcurrent protection resistor is greater than an overcurrent protection threshold, or when a resistance of the thermistor overranges an over temperature protection range, the bypass switch bypasses the first output port to the ground for bypassing the load. The control circuit is reliable and miniaturized with overcurrent protection and over temperature protection in an integrated circuit.

14 Claims, 2 Drawing Sheets

CONTROL CIRCUIT WITH OVERCURRENT PROTECTION AND OVER TEMPERATURE PROTECTION

BACKGROUND OF THE INVENTION

1. Field of the Invention

The present invention relates to a control circuit, and more particularly a control circuit with overcurrent protection (OCP) and over temperature protection (OTP).

2. Description of the Related Art

A light emitting diode (LED) is a type of diode that converts electric energy into an emitting light. The LED, as a semiconductor chip, consists of a P-type semiconductor with primary holes and an N-type semiconductor with primary electrons. The P-type semiconductor and the N-type semiconductor form a P-N junction in the LED, and when current passes through the semiconductor chip, electrons move from the N-type semiconductor (N-area) toward the P-type semiconductor (P-area) and recombine with holes to emit photons via direct recombination process.

Currently existing ordinary LEDs, however, have the following technical problem: usually multiple LEDs are first connected in series as a string of lights, and then multiple strings of lights are then connected in parallels. This electrical connection method for LEDs makes the string of lights more susceptible to malfunctions, because when any one of the LEDs is broken or disconnected from the string of lights, the said string of lights stops working entirely. In such a situation, other intact LEDs on the said string of lights would then have wasted their cost, and with the said string of lights malfunctioning, overall less brightness of light is emitted from the strings of lights, and thus impacting the aesthetics of the strings of lights.

To overcome the aforementioned overly simplistic electrical connection method of LEDs, a patent application with publication number CN201920116710.9 is filed on Jan. 23 2019. The said patent publication disclosed a lamp string with non-turn-off function and LED independent flickering function. The said patent publication includes a control chip U1 as well as a forward and reverse control circuit, however, upon continuous research, the applicant discovered that the said patent publication lacks protection against overcurrent or over temperatures, and hence the said patent publication needs to be further improved upon.

SUMMARY OF THE INVENTION

To overcome the aforementioned problems, the present invention provides a control circuit with overcurrent protection (OCP) and over temperature protection (OTP). The control circuit is novel and neatly designed with protections circuit against overcurrent and over temperature. The control circuit of the present invention is therefore safer to use and more reliable than a control chip of prior art.

The control circuit with OCP and OTP of the present invention includes:

a control chip, having a first pin and a second pin;
a protection circuit module, including:
   a first output port;
   a second output port; wherein the first output port and the second output port are configured to electrically connect to a load;

an overcurrent protection resistor, electrically connected between the second output port and a ground;
a comparator unit; wherein a node between the overcurrent protection resistor and the second output port is electrically connected to the comparator unit;
a bypass switch, electrically connected to the comparator unit, the ground, and the first pin and the second pin of the control chip;
a thermistor, electrically connected to the comparator unit;
wherein when a current flowing through the overcurrent protection resistor is greater than an overcurrent protection threshold, the bypass switch bypasses the first output port to the ground for bypassing the load;
wherein when a resistance of the thermistor overranges an over temperature protection range, the bypass switch bypasses the first output port to the ground for bypassing the load.

In other words, when the load decreases its electrical resistance, the current that flows through the overcurrent protection resistor will increase amperes, and at the same time, the overcurrent protection resistor will receive more voltage. The increase in voltage experienced by the overcurrent protection resistor also increases the voltage received by the comparator unit, allowing the comparator unit to stop electricity from flowing through the load. This brings forth the overcurrent protection function of the present invention.

Moreover, when the thermistor increases its temperature, the resistance of the thermistor overranges the over temperature protection range, allowing the comparator unit to receive different voltage levels, thus allowing the comparator unit to stop electricity from flowing through the load.

In an embodiment, a fourth pin and a seventh pin of the comparator unit are respectively electrically connected to a comparator voltage source. A fifth pin of the comparator unit is electrically connected to the comparator voltage source through the thermistor, and an eighth pin of the comparator unit is electrically connected to the node between the overcurrent protection resistor and the second output port. A sixth pin and a ninth pin of the comparator unit are respectively electrically connected to the bypass switch.

In an embodiment, the bypass switch is a master regulator triode, and the master regulator triode has a collector, a base, and an emitter. The base is electrically connected to the sixth pin and the ninth pin of the comparator unit. The emitter and the collector are respectively electrically connected to the ground and connected to the load through the first output port and the second output port, and the first pin and the second pin of the control chip.

In an embodiment, the control circuit further includes a first power port, a second power port, and a power delivery circuit. The second power port is electrically connected to the ground, and the first power port and the second power port are configured to connect to a voltage source to receive electricity. The power delivery circuit is electrically connected to the first power port, the ground through the overcurrent protection resistor, the first output port, and the second output port. The emitter is electrically connected to the ground, and the collector is electrically connected to the power delivery circuit, the first pin of the control chip and the second pin of the control chip respectively.

When the fourth pin of the comparator unit has a higher voltage than the fifth pin of the comparator unit, the sixth pin of the comparator unit is configured to output a low voltage to the base of the master regulator triode. When the fourth pin of the comparator unit has a lower voltage than the fifth pin of the comparator unit, the sixth pin of the comparator unit is configured to output a high voltage to the base of the master regulator triode.

When the seventh pin of the comparator unit has a higher voltage than the eighth pin of the comparator unit, the ninth pin of the comparator unit is also configured to output the low voltage to the base of the master regulator triode. When the seventh pin of the comparator unit has a lower voltage than the eighth pin of the comparator unit, the ninth pin of the comparator unit is also configured to output the high voltage to the base of the master regulator triode.

The control chip outputs a high voltage signal through the first pin and the second pin to the collector of the master regulator triode. When the base of the master regulator triode is kept at the low voltage, the master regulator triode insulates the collector and the emitter, allowing the power delivery circuit to receive the high voltage signal and subsequently to deliver the current received from the first power port to the load that is connected between the first output port and the second output port.

When the base of the master regulator triode is kept at the high voltage from receiving the high voltage from either the sixth pin or the ninth pin of the comparator unit, the master regulator triode conducts the collector and the emitter, thus preventing the power delivery circuit from receiving the high voltage signal, and stopping the power delivery circuit from delivering the current to the load.

In an embodiment, the power delivery circuit further includes a first triode, a second triode, a third triode, a fourth triode, a fifth triode, and a sixth triode. The first triode has a first collector, a first base, and a first emitter. The first emitter of the first triode and the second emitter of the second triode are electrically connected to the first power port. The second triode has a second collector, a second base, and a second emitter. The third triode has a third collector, a third base, and a third emitter. The first collector of the first triode is electrically connected to the first output port and the third collector of the third triode. The fourth triode has a fourth collector, a fourth base, and a fourth emitter. The second collector of the second triode is electrically connected to the second output port and the fourth collector of the fourth triode; wherein the third emitter of the third triode and the fourth emitter of the fourth triode are electrically connected to the ground. The fifth triode has a fifth collector, a fifth base, and a fifth emitter. The fifth collector is electrically connected to the first base of the first triode, the fifth base is electrically connected to the collector of the master regulator triode, and the fifth emitter is electrically connected to the fourth base of the fourth triode. The sixth triode has a sixth collector, a sixth base, and a sixth emitter. The sixth collector is electrically connected to the second base of the second triode, the sixth base is also electrically connected to the collector of the master regulator triode, and the sixth emitter is electrically connected to the third base of the third triode.

In an embodiment, the protection circuit module further includes a first diode and a second diode. The first diode has a first anode and a first cathode. The first anode is electrically connected to the first pin of the control chip and the fifth base of the fifth triode, and the first cathode is electrically connected to the collector of the master regulator triode. The second diode has a second anode and a second cathode. The second anode is electrically connected to the second pin of the control chip and the sixth base of the sixth triode, and the second cathode is electrically connected to the collector of the master regulator triode.

In an embodiment, the protection circuit module further includes a first resistor, a second resistor, a third resistor, a fourth resistor, a fifth resistor, and a sixth resistor. The first resistor is electrically connected between the first base of the first triode and the fifth collector of the fifth triode. The second resistor is electrically connected between the second base of the second triode and the sixth collector of the sixth triode. The third resistor is electrically connected between the fifth base of the fifth triode and the second output port. The fourth resistor is electrically connected between the sixth base of the sixth triode and the second output port. The fifth resistor is electrically connected between the third base of the third triode and the second output port. The sixth resistor is electrically connected between the fourth base of the fourth triode and the second output port.

In an embodiment, the protection circuit module further includes a first connection port and a second connection port. The first connection port is electrically connected to the first pin of the control chip, the collector of the master regulator triode, and the power delivery circuit. The second connection port is electrically connected to the second pin of the control chip, the collector of the master regulator triode, and the power delivery circuit.

In an embodiment, a resistor is electrically connected between the first pin of the control chip and the first connection port of the protection circuit module, and another resistor is electrically connected between the second pin of the control chip and the second connection port of the protection circuit module.

In an embodiment, the protection circuit module further includes a third diode and a fourth diode. The third diode has a third anode and a third cathode. The fourth diode has a fourth anode and a fourth cathode. The third anode is electrically connected to the sixth pin of the comparator unit, and the third cathode is electrically connected to the base of the master regulator triode. The fourth anode is electrically connected to the ninth pin of the comparator unit, and the fourth cathode is also electrically connected to the base of the master regulator triode.

In an embodiment, the protection circuit module further includes a voltage provider. The voltage provider is electrically connected to the first power port, the fourth pin of the comparator unit, and the seventh pin of the comparator unit. The voltage provider receives the electricity from the first power port, converts the electricity to a reference voltage signal, and outputs the reference voltage signal to both the fourth pin of the comparator unit and the seventh pin of the comparator unit as the comparator voltage source for the comparator unit.

In an embodiment, the reference voltage signal is at least 10 folds smaller in voltage than the electricity received by the first power port.

In an embodiment, the thermistor is a negative temperature coefficient (NTC) thermistor.

DETAILED DESCRIPTION OF THE INVENTION

For a skilled personnel to better understand the present invention, the following details several embodiments of the present invention, as the present invention provides a circuit diagram of a control circuit with overcurrent protection (OCP) and over temperature protection (OTP).

Figure 1:
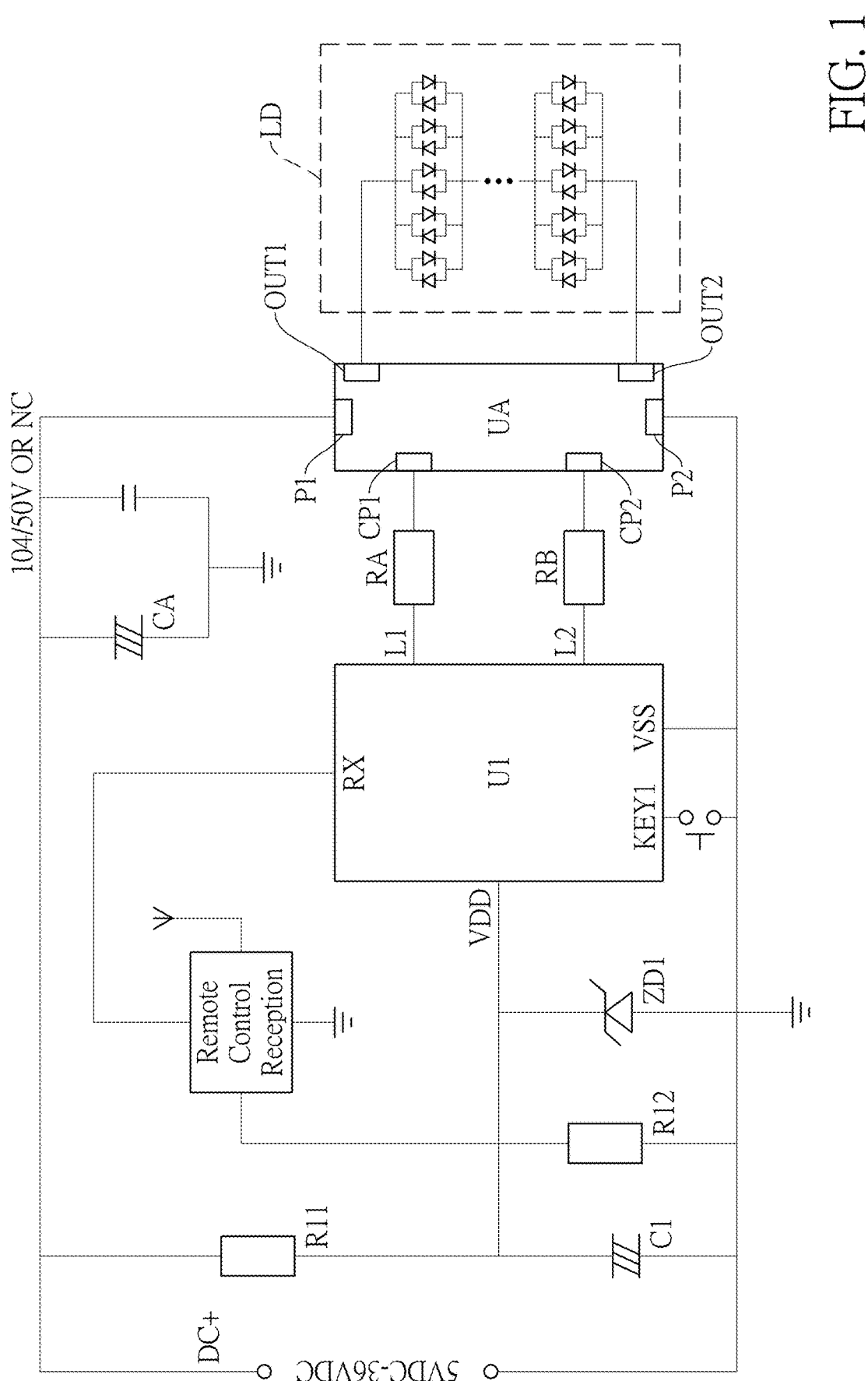
FIG. 1 is a circuit diagram of a control circuit with overcurrent protection and over temperature protection of the present invention.
Figure 2:
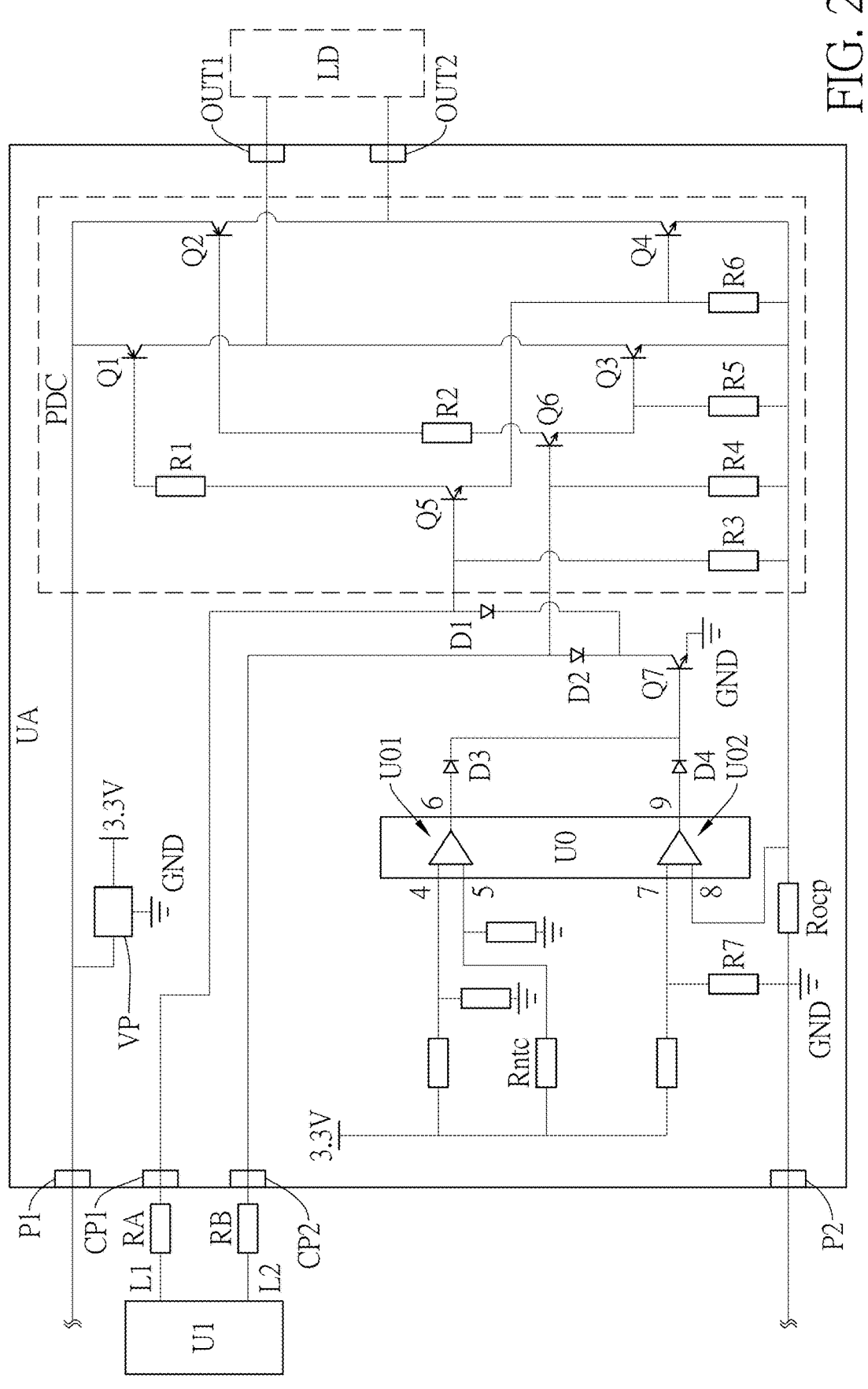
FIG. 2 is a circuit diagram of a protection circuit module of the control circuit of the present invention.

With reference to FIGS. 1 and 2, in a first embodiment, the control circuit with OCP and OTP includes a control chip U1 and a protection circuit module UA that is electrically connected to the control chip U1. The output ports of the protection circuit module UA, namely a first output port OUT1 and a second output port OUT2, are electrically connected to a load LD.

The control chip U1 has a first pin L1 and a second pin L2, and the control chip U1 outputs a voltage signal, such as a high voltage signal, through the first pin L1 and the second pin L2 towards the protection circuit module UA.

The protection circuit module UA includes multiple ports such as the first output port OUT1, the second output port OUT2, a first power port P1, a second power port P2, a first connection port CP1, and a second connection port CP2.

The protection circuit module UA also includes a comparator unit U0, an overcurrent protection resistor Rocp, a thermistor Rntc, a bypass switch, and a power delivery circuit PDC.

The overcurrent protection resistor Rocp is electrically connected between the second output port OUT2 and a ground GND. The comparator unit U0 includes a first comparator U01 and a second comparator U02. The comparator unit U0 also has multiple pins, including a fourth pin 4, a fifth pin 5, a sixth pin 6, a seventh pin 7, an eighth pin 8, and a ninth pin 9. The fourth pin 4, the fifth pin 5, and the sixth pin 6 are electrically connected to the first comparator U01. The seventh pin 7, the eighth pin 8, and the ninth pin 9 are electrically connected to the second comparator U02.

A node between the overcurrent protection resistor Rocp and the second output port OUT2 is electrically connected to the comparator unit U0. More specifically, the eighth pin 8 of the comparator U0 unit is electrically connected to the node between the overcurrent protection resistor Rocp and the second output port OUT2.

The bypass switch is electrically connected to the comparator unit U0, the ground GND, and the first pin L1 and the second pin L2 of the control chip U1. The thermistor Rntc is also electrically connected to the comparator unit U0.

The first power port P1 and the second power port P2 are configured to connect to a voltage source to receive electricity. Furthermore, the second power port P2 is electrically connected to the ground GND. As such, when a current from the said electricity flows through the overcurrent protection resistor Rocp and the load LD, and the said current is greater than an overcurrent protection threshold of the overcurrent protection resistor Rocp, the bypass switch bypasses the first output port OUT1 to the ground GND for bypassing the load LD, and thus stopping the current from flowing through the load LD. Furthermore, when a resistance of the thermistor Rntc overranges an over temperature protection range of the thermistor Rntc, the bypass switch also bypasses the first output port OUT1 to the ground GND in same effect for bypassing the load LD.

More particularly, a voltage provider VP is electrically connected to the first power port P1 for receiving the electricity. The voltage provider VP then converts the electricity to a reference voltage signal, and outputs the reference voltage signal to both the fourth pin 4 and the seventh pin 7 of the comparator unit U0. In other words, the voltage provider VP is also electrically connected to the fourth pin 4 of the comparator unit U0 and the seventh pin 7 of the comparator unit U0. The voltage provider VP functions as a comparator voltage source for the comparator unit U0 and the comparator unit U0. As such, the fourth pin 4 of the comparator unit U0 and the seventh pin 7 of the comparator unit U0 are respectively electrically connected to the comparator voltage source.

Furthermore, the fifth pin 5 of the comparator unit U0 is electrically connected to the comparator voltage source through the thermistor Rntc. The sixth pin 6 and the ninth pin 9 of the comparator unit U0 are respectively electrically connected to the bypass switch. In an embodiment of the present invention, the thermistor Rntc is a negative temperature coefficient (NTC) thermistor, allowing the thermistor Rntc to have less electrical resistance as temperature increases.

More particularly, in the present embodiment, the bypass switch is a master regulator triode Q7, and the master regulator triode Q7 has a collector, a base, and an emitter. The base of the master regulator triode Q7 is electrically connected to the sixth pin 6 and the ninth pin 9 of the comparator unit U0. The emitter and the collector of the master regulator triode Q7 are respectively electrically connected to the ground GND and connected to the load LD through the first output port OUT1 and the second output port OUT2, and the first pin L1 and the second pin L2 of the control chip U1 respectively through the first connection port CP1 and the second connection port CP2.

More particularly, in this embodiment, the emitter of the master regulator triode Q7 is electrically connected to the ground GND. The collector of the master regulator triode Q7 is electrically connected to the first pin L1 and the second pin L2 of the control chip U1 respectively through the first connection port CP1 and the second connection port CP2, and electrically connected to the load LD through the power delivery circuit PDC and through the first output port OUT1 and the second output port OUT2.

The power delivery circuit PDC is electrically connected to the first power port P1, the ground GND through the overcurrent protection resistor Rocp, the first output port OUT1, the second output port OUT2, the first connection port CP1, the second connection port CP2, and the collector of the master regulator triode Q7. The first connection port CP1 is electrically connected to the first pin L1 of the control chip U1, the collector of the master regulator triode Q7, and the power delivery circuit PDC. The second connection port CP2 is electrically connected to the second pin L2 of the control chip U1, the collector of the master regulator triode Q7, and the power delivery circuit PDC.

When the fourth pin 4 of the comparator unit U0 has a higher voltage than the fifth pin 5 of the comparator unit U0, the sixth pin 6 of the comparator unit U0 is configured to output a low voltage to the base of the master regulator triode Q7. When the fourth pin 4 of the comparator unit U0 has a lower voltage than the fifth pin 5 of the comparator unit U0, the sixth pin 6 of the comparator unit U0 is configured to output a high voltage to the base of the master regulator triode Q7.

Similarly, when the seventh pin 7 of the comparator unit U0 has a higher voltage than the eighth pin 8 of the comparator unit U0, the ninth pin 9 of the comparator unit U0 is also configured to output the low voltage to the base of the master regulator triode Q7. When the seventh pin 7 of the comparator unit U0 has a lower voltage than the eighth pin 8 of the comparator unit U0, the ninth pin 9 of the comparator unit U0 is also configured to output the high voltage to the base of the master regulator triode Q7.

The high voltage signal outputted by the control chip U1 goes to the collector of the master regulator triode Q7. When the base of the master regulator triode Q7 is kept at the low voltage, the master regulator triode Q7 insulates the collector and the emitter, allowing the power delivery circuit PDC to receive the high voltage signal and subsequently to deliver the electricity received from the first power port P1 to the load LD that is connected between the first output port OUT1 and the second output port OUT2.

When the base of the master regulator triode Q7 is kept at the high voltage from receiving the high voltage from either the sixth pin 6 or the ninth pin 9 of the comparator unit U0, the master regulator triode Q7 conducts the collector and the emitter, thus preventing the power delivery circuit PDC from receiving the high voltage signal, and stopping the power delivery circuit PDC from delivering the electricity to the load LD.

In an embodiment, the electricity is a direct current (DC) electricity of 50 volts. The reference voltage signal is at least 10 folds smaller in voltage than the electricity received by the first power port. For example, the reference voltage signal has a voltage of 3.3 volts.

More particularly, the power delivery circuit includes a first triode Q1, a second triode Q2, a third triode Q3, a fourth triode Q4, a fifth triode Q5, and a sixth triode Q6.

The first triode Q1 has a first collector, a first base, and a first emitter. The second triode Q2 has a second collector, a second base, and a second emitter. The third triode Q3 has a third collector, a third base, and a third emitter. The fourth triode Q4 has a fourth collector, a fourth base, and a fourth emitter. The fifth triode Q5 has a fifth collector, a fifth base, and a fifth emitter. The sixth triode Q6 has a sixth collector, a sixth base, and a sixth emitter.

The first emitter of the first triode Q1 and the second emitter of the second triode Q2 are electrically connected to the first power port P1. The first collector of the first triode Q1 is electrically connected to the first output port OUT1 and the third collector of the third triode Q3. The second collector of the second triode Q2 is electrically connected to the second output port OUT2 and the fourth collector of the fourth triode Q4. The third emitter of the third triode Q3 and the fourth emitter of the fourth triode Q4 are electrically connected to the ground GND.

The fifth collector of the fifth triode Q5 is electrically connected to the first base of the first triode Q1, the fifth base of the fifth triode Q5 is electrically connected to the collector of the master regulator triode Q7, and the fifth emitter of the fifth triode Q5 is electrically connected to the fourth base of the fourth triode Q4. The sixth collector of the sixth triode Q6 is electrically connected to the second base of the second triode Q2, the sixth base of the sixth triode Q6 is also electrically connected to the collector of the master regulator triode Q7, and the sixth emitter of the sixth triode Q6 is electrically connected to the third base of the third triode Q3.

When the load LD decreases its electrical resistance, more current will flow through the overcurrent protection resistor Rocp. At the same time, the overcurrent protection resistor Rocp will receive more voltage as more voltage will be divided to the overcurrent protection resistor Rocp. The increase in voltage experienced by the overcurrent protection resistor Rocp also increases the voltage received by the eighth pin 8 of the comparator unit U0. This allows the seventh pin 7 of the comparator unit U0 to have a lower voltage than the eighth pin 8 of the comparator unit U0. The comparator unit U0 then increases the voltage provided to the base of the master regulator triode Q7, allowing the collector of the master regulator triode Q7 to connect to the ground GND through the emitter of the master regulator triode Q7. This shorts the power delivery circuit PDC by decreasing voltages at the fifth base of the fifth triode Q5 and the sixth base of the sixth triode Q6.

Subsequently, having the fifth collector and the fifth emitter disconnected, voltages decrease at the first base of the first triode Q1 and the fourth base of the fourth triode Q4. By also having the sixth collector and the sixth emitter disconnected, voltages decrease at the second base of the second triode Q2 and the third base of the third triode Q3. The first triode Q1, the fourth triode Q4, the second triode Q2, and the third triode Q3 then subsequently stop electricity from flowing through the power delivery circuit PDC to the load LD. This brings forth the overcurrent protection function of the present invention.

On the other hand, when the thermistor Rntc increases its temperature, the thermistor Rntc decreases its electrical resistance, allowing the fifth pin 5 of the comparator unit U0 to receive more voltage from the comparator voltage source. This subsequently leads to the situation for the fourth pin 4 to have a lower voltage than the fifth pin 5 of the first comparator. The comparator unit U0 then increases the voltage provided to the base of the master regulator triode Q7, and thus follows similar logic mentioned before to stop electricity from flowing to the load LD. This brings forth the over temperature protection function of the present invention.

In other words, by having the thermistor Rntc working in combination with the comparator unit U0, the present invention is able to increase voltage provided to the base of the master regulator triode Q7 when temperature rises pass a threshold for the collector and the emitter of the master regulator triode Q7 to conduct electricity. In addition, by having the overcurrent protection resistor Rocp working in combination with the comparator unit U0, the present invention is able to increase voltage provided to the base of the master regulator triode Q7 when current passing through the load LD rises pass another threshold for the collector and the emitter of the master regulator triode Q7 to conduct electricity. When the collector and the emitter of the master regulator triode Q7 conduct electricity, the load LD stops receiving electricity, hence achieving the OCP and the OTP functions.

The control circuit of the present invention is an integrated circuit (IC) that is novel and neatly designed. For the reasons above, the control circuit of the present invention is also safer to use and more reliable than a control chip of prior art. As the control circuit is miniaturized into the IC, the IC is also protected with the OCP and the OTP functions.

Furthermore, the protection circuit module UA further includes a first resistor R1, a second resistor R2, a third resistor R3, a fourth resistor R4, a fifth resistor R5, a sixth resistor R6, and a seventh resistor R7.

The first resistor R1 is electrically connected between the first base of the first triode Q1 and the fifth collector of the fifth triode Q5. The second resistor R2 is electrically connected between the second base of the second triode Q2 and the sixth collector of the sixth triode Q6. The third resistor R3 is electrically connected between the fifth base of the fifth triode Q5 and the second output port OUT2. The fourth resistor R4 is electrically connected between the sixth base of the sixth triode Q6 and the second output port OUT2. The fifth resistor R5 is electrically connected between the third base of the third triode Q3 and the second output port OUT2. The sixth resistor R6 is electrically connected between the fourth base of the fourth triode Q4 and the second output port OUT2. The seventh resistor R7 is electrically connected between the seventh pin 7 of the comparator unit U0 and the ground GND. The resistors R1 to R7 are able to help dividing voltages in various parts of the control circuit, preventing any of the triodes Q1 to Q6 and the master regulator triode Q7 from being damaged by excessive voltages.

The protection circuit module UA also includes a first diode D1, a second diode D2, a third diode D3, and a fourth diode D4. The control circuit with OCP and OTP also includes a resistor RA and a resistor RB.

The first diode D1 has a first anode and a first cathode. The second diode D2 has a second anode and a second cathode. The third diode D3 has a third anode and a third cathode. The fourth diode D4 has a fourth anode and a fourth cathode.

The first anode of the first diode D1 is electrically connected to the fifth base of the fifth triode Q5 and connected to the first pin L1 of the control chip U1 through the first connection port CP1 and the resistor RA. The first cathode of the first diode D1 is electrically connected to the collector of the master regulator triode Q7. The resistor RA is electrically connected between the first pin L1 of the control chip U1 and the first connection port CP1 of the protection circuit module UA.

The second anode of the second diode D2 is electrically connected to the sixth base of the sixth triode Q6 and connected to the second pin L2 of the control chip U1 through the second connection port CP2 and the resistor RB. The second cathode of the second diode D2 is electrically connected to the collector of the master regulator triode Q7. The resistor RB is electrically connected between the second pin L2 of the control chip U1 and the second connection port CP2 of the protection circuit module UA.

The third anode of the third diode D3 is electrically connected to the sixth pin 6 of the comparator unit U0. The fourth anode of the fourth diode D4 is electrically connected to the ninth pin 9 of the comparator unit U0. The third cathode of the third diode D3 and the fourth cathode of the fourth diode D4 are respectively electrically connected to the base of the master regulator triode Q7.

The first diode D1 prevents electricity outputted from the second pin L2 from flowing to the first pin L1 or the fifth base of the fifth triode Q5. The second diode D2 prevents electricity outputted from the first pin L1 from flowing to the second pin L2 or the sixth base of the sixth triode Q6. The third diode D3 prevents electricity outputted from the ninth pin 9 of the comparator unit U0 from flowing to the sixth pin 6 of the comparator unit U0. The fourth diode D4 prevents electricity outputted from the sixth pin 6 of the comparator unit U0 from flowing to the ninth pin 9 of the comparator unit U0.

In an embodiment, as shown in FIG. 1, the load LD connected to the first output port OUT1 and the second output port OUT2 has multiple electrical components, such as diodes, or more particularly light emitting diodes (LEDs), connected in combinations of series connections and parallel connections. For example, the load LD can have multiple big units connected in series. Each of the big units have multiple small units connected in parallels. Each of the small units consist of two diodes or LEDs that are facing opposite directions and connected in parallel as shown in FIG. 1. This ensure a current passing through each of the small units will always pass through one of the two diodes or LEDs regardless of a direction of the current, and thus ensures the big units connected in series can conduct electricity regardless of a direction of a current that flows between the first output port OUT1 and the second output port OUT2.

What is claimed is:

1. A control circuit with overcurrent protection and over temperature protection, comprising:
a control chip, having a first pin and a second pin;
a protection circuit module, comprising:
  a first output port;
  a second output port; wherein the first output port and the second output port are configured to electrically connect to a load;
  an overcurrent protection resistor, electrically connected between the second output port and a ground;
  a comparator unit; wherein a node between the overcurrent protection resistor and the second output port is electrically connected to the comparator unit;
  a bypass switch, electrically connected to the comparator unit, the ground, and the first pin and the second pin of the control chip;
  a thermistor, electrically connected to the comparator unit;
  wherein when a current flowing through the overcurrent protection resistor is greater than an overcurrent protection threshold, the bypass switch bypasses the first output port to the ground for bypassing the load;
  wherein when a resistance of the thermistor overranges an over temperature protection range, the bypass switch bypasses the first output port to the ground for bypassing the load.

2. The control circuit as claimed in claim 1, wherein a fourth pin and a seventh pin of the comparator unit are respectively electrically connected to a comparator voltage source;
  wherein a fifth pin of the comparator unit is electrically connected to the comparator voltage source through the thermistor, and an eighth pin of the comparator unit is electrically connected to the node between the overcurrent protection resistor and the second output port;
  wherein a sixth pin and a ninth pin of the comparator unit are respectively electrically connected to the bypass switch.

3. The control circuit as claimed in claim 2, wherein the bypass switch is a master regulator triode, and the master regulator triode has a collector, a base, and an emitter;
  wherein the base is electrically connected to the sixth pin and the ninth pin of the comparator unit,
  wherein the emitter and the collector are respectively electrically connected to the ground and connected to the load through the first output port and the second output port, and the first pin and the second pin of the control chip.

4. The control circuit as claimed in claim 3, further comprising:
  a first power port;
  a second power port, electrically connected to the ground;
    wherein the first power port and the second power port are configured to connect to a voltage source to receive electricity;
  a power delivery circuit, electrically connected to the first power port, the ground through the overcurrent protection resistor, the first output port, and the second output port;
  wherein the emitter is electrically connected to the ground, and the collector is electrically connected to the power delivery circuit, the first pin of the control chip and the second pin of the control chip respectively;
  wherein when the fourth pin of the comparator unit has a higher voltage than the fifth pin of the comparator unit, the sixth pin of the comparator unit is configured to output a low voltage to the base of the master regulator triode; and when the fourth pin of the comparator unit has a lower voltage than the fifth pin of the comparator unit, the sixth pin of the comparator unit is configured to output a high voltage to the base of the master regulator triode;

wherein when the seventh pin of the comparator unit has a higher voltage than the eighth pin of the comparator unit, the ninth pin of the comparator unit is also configured to output the low voltage to the base of the master regulator triode; and when the seventh pin of the comparator unit has a lower voltage than the eighth pin of the comparator unit, the ninth pin of the comparator unit is also configured to output the high voltage to the base of the master regulator triode;

wherein the control chip outputs a high voltage signal through the first pin and the second pin to the collector of the master regulator triode; when the base of the master regulator triode is kept at the low voltage, the master regulator triode insulates the collector and the emitter, allowing the power delivery circuit to receive the high voltage signal and subsequently to deliver the current received from the first power port to the load that is connected between the first output port and the second output port;

wherein when the base of the master regulator triode is kept at the high voltage from receiving the high voltage from either the sixth pin or the ninth pin of the comparator unit, the master regulator triode conducts the collector and the emitter, thus preventing the power delivery circuit to receive the high voltage signal and stopping the power delivery circuit from delivering the current to the load.

5. The control circuit as claimed in claim 4, wherein the power delivery circuit further comprises:

a first triode, having a first collector, a first base, and a first emitter; wherein the first emitter of the first triode and the second emitter of the second triode are electrically connected to the first power port;

a second triode, having a second collector, a second base, and a second emitter;

a third triode, having a third collector, a third base, and a third emitter; wherein the first collector of the first triode is electrically connected to the first output port and the third collector of the third triode;

a fourth triode, having a fourth collector, a fourth base, and a fourth emitter; wherein the second collector of the second triode is electrically connected to the second output port and the fourth collector of the fourth triode; wherein the third emitter of the third triode and the fourth emitter of the fourth triode are electrically connected to the ground;

a fifth triode, having a fifth collector, a fifth base, and a fifth emitter; wherein the fifth collector is electrically connected to the first base of the first triode, the fifth base is electrically connected to the collector of the master regulator triode, and the fifth emitter is electrically connected to the fourth base of the fourth triode;

a sixth triode, having a sixth collector, a sixth base, and a sixth emitter; wherein the sixth collector is electrically connected to the second base of the second triode, the sixth base is also electrically connected to the collector of the master regulator triode, and the sixth emitter is electrically connected to the third base of the third triode.

6. The control circuit as claimed in claim 5, wherein the protection circuit module further comprises:

a first diode, having a first anode and a first cathode; wherein the first anode is electrically connected to the first pin of the control chip and the fifth base of the fifth triode, and the first cathode is electrically connected to the collector of the master regulator triode;

a second diode, having a second anode and a second cathode; wherein the second anode is electrically connected to the second pin of the control chip and the sixth base of the sixth triode, and the second cathode is electrically connected to the collector of the master regulator triode.

7. The control circuit as claimed in claim 5, wherein the protection circuit module further comprises:

a first resistor, electrically connected between the first base of the first triode and the fifth collector of the fifth triode;

a second resistor, electrically connected between the second base of the second triode and the sixth collector of the sixth triode;

a third resistor, electrically connected between the fifth base of the fifth triode and the second output port;

a fourth resistor, electrically connected between the sixth base of the sixth triode and the second output port;

a fifth resistor, electrically connected between the third base of the third triode and the second output port;

a sixth resistor, electrically connected between the fourth base of the fourth triode and the second output port.

8. The control circuit as claimed in claim 4, wherein the protection circuit module further comprises:

a first connection port, electrically connected to the first pin of the control chip, the collector of the master regulator triode, and the power delivery circuit;

a second connection port, electrically connected to the second pin of the control chip, the collector of the master regulator triode, and the power delivery circuit.

9. The control circuit as claimed in claim 8, further comprising a resistor that is electrically connected between the first pin of the control chip and the first connection port of the protection circuit module.

10. The control circuit as claimed in claim 8, further comprising a resistor that is electrically connected between the second pin of the control chip and the second connection port of the protection circuit module.

11. The control circuit as claimed in claim 4, wherein the protection circuit module further comprises:

a third diode, having a third anode and a third cathode; wherein the third anode is electrically connected to the sixth pin of the comparator unit, and the third cathode is electrically connected to the base of the master regulator triode;

a fourth diode, having a fourth anode and a fourth cathode; wherein the fourth anode is electrically connected to the ninth pin of the comparator unit, and the fourth cathode is also electrically connected to the base of the master regulator triode.

12. The control circuit as claimed in claim 4, wherein the protection circuit module further comprises:

a voltage provider, electrically connected to the first power port, the fourth pin of the comparator unit, and the seventh pin of the comparator unit;

wherein the voltage provider receives the electricity from the first power port, converts the electricity to a reference voltage signal, and outputs the reference voltage signal to both the fourth pin of the comparator unit and the seventh pin of the comparator unit as the comparator voltage source for the comparator unit.

13. The control circuit as claimed in claim 12, wherein the reference voltage signal is at least 10 folds smaller in voltage than the electricity received by the first power port.

14. The control circuit as claimed in claim 4, wherein the thermistor is a negative temperature coefficient (NTC) thermistor.

* * * * *